US006307762B1

(12) United States Patent
Shiobara

(10) Patent No.: US 6,307,762 B1
(45) Date of Patent: Oct. 23, 2001

(54) POWER SUPPLYING CIRCUIT AND METHOD

(75) Inventor: Hideaki Shiobara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/459,379

(22) Filed: Dec. 13, 1999

(30) Foreign Application Priority Data

Dec. 14, 1998 (JP) .............................. P10-354926

(51) Int. Cl.⁷ ...................................... H02M 7/23
(52) U.S. Cl. .............................. 363/69; 307/86
(58) Field of Search .................. 363/65, 67, 69; 323/267; 307/44, 64, 82, 85, 86

(56) References Cited

U.S. PATENT DOCUMENTS 4,751,580 * 6/1988 Fitzgerald et al. ................... 37/64 X
5,353,215 * 10/1994 Dinwiddie et al. .................... 363/65

* cited by examiner

Primary Examiner—Jessica Han
(74) Attorney, Agent, or Firm—Ronald P. Kananen; Rader, Fishman & Grauer

(57) ABSTRACT

Only the standby transformer supplies a current to a control power source while the operation power is off, and supplies a current to a primary power relay when the primary power relay is activated. After activation of the primary power relay, both of the standby transformer and a main transformer supply currents to the control power source and the primary power relay. This makes it possible to reduce the rated current of the standby transformer as well as the standby power.

9 Claims, 3 Drawing Sheets

POWER SUPPLYING CIRCUIT AND METHOD

FIELD OF THE INVENTION

The present invention relates to a power supplying circuit and method that are used for audio equipment also forth. In particular, the invention relates to a power supplying circuit and method for supplying standby power.

BACKGROUND OF THE INVENTION

In recent years, uses of electric products such as audio equipment and a television receiver incorporating a remote control using a remote controller and automatic time control using a timer, have increased. Such electric products commonly have a function that the operation power can be turned on/off by such remote control or automatic time control.

Where the operation power is turned on/off by the remote control or the automatic time control, a supply of standby power is needed to enable the remote control or the automatic time control, even when the operation power is in the off state. Examples of locations to which standby power need to be supplied are a remote controller light receiving section and a control microcomputer.

A power supplying circuit for supplying such standby power has a standby transformer for standby power and a main transformer for operation power. The supply of power to the remote controller light receiving section, the control microcomputer, and so forth is performed by the standby transformer, and the supply of power to a primary power relay during supply of operation power is also performed by the standby transformer. In this type of power supplying circuit, during supply of operation power only the standby transformer supplies power to the remote controller light receiving section, the control microcomputer, and so forth and the primary power relay. The standby transformer is required to have a capacity large enough to supply such power.

For example, a power supplying circuit for remote controller control of audio equipment is required to supply a current of 20 mA to the remote controller light receiving section, the control microcomputer, and so forth. After turning-on of the operation power, a current of 40 mA needs to be supplied to the primary power relay. Therefore, after turning-on of the operation power, a total current of 60 mA flows through the standby transformer. The standby transformer is required to have a rated current of more than 60 mA.

However, there is a problem that, in general, in a transformer having a large rated current, the standby current cannot be made small because of large loss including iron loss and copper loss.

The present invention has been made in view of the above circumstances in the art, and an object of the invention is therefore to provide a power supplying circuit and method that make it possible to use a transformer having a small rated current as a standby transformer.

SUMMARY OF THE INVENTION

To attain the above object, the invention provides a power supplying circuit comprising a primary power relay for opening and closing a main transformer; a standby transformer having a smaller power capacity than a power consumption capacity of the primary power relay; and power supply control means for causing the primary power relay to turn on the main transformer, and for causing supply of power from an output of the main transformer to the primary power relay after turning-on of the main transformer.

Only the standby transformer supplies a control current to a remote controller light receiving section, a control microcomputer, and so forth while the operation power is off, and supplies a drive current to the primary power relay at an instant when the primary power relay is activated. After activation of the primary power supply, both of the standby transformer and the main transformer supply a control current and a drive current for the primary power relay.

DETAILED DESCRIPTION OF THE PREFERRED EMBODIMENTS

Figure 1:
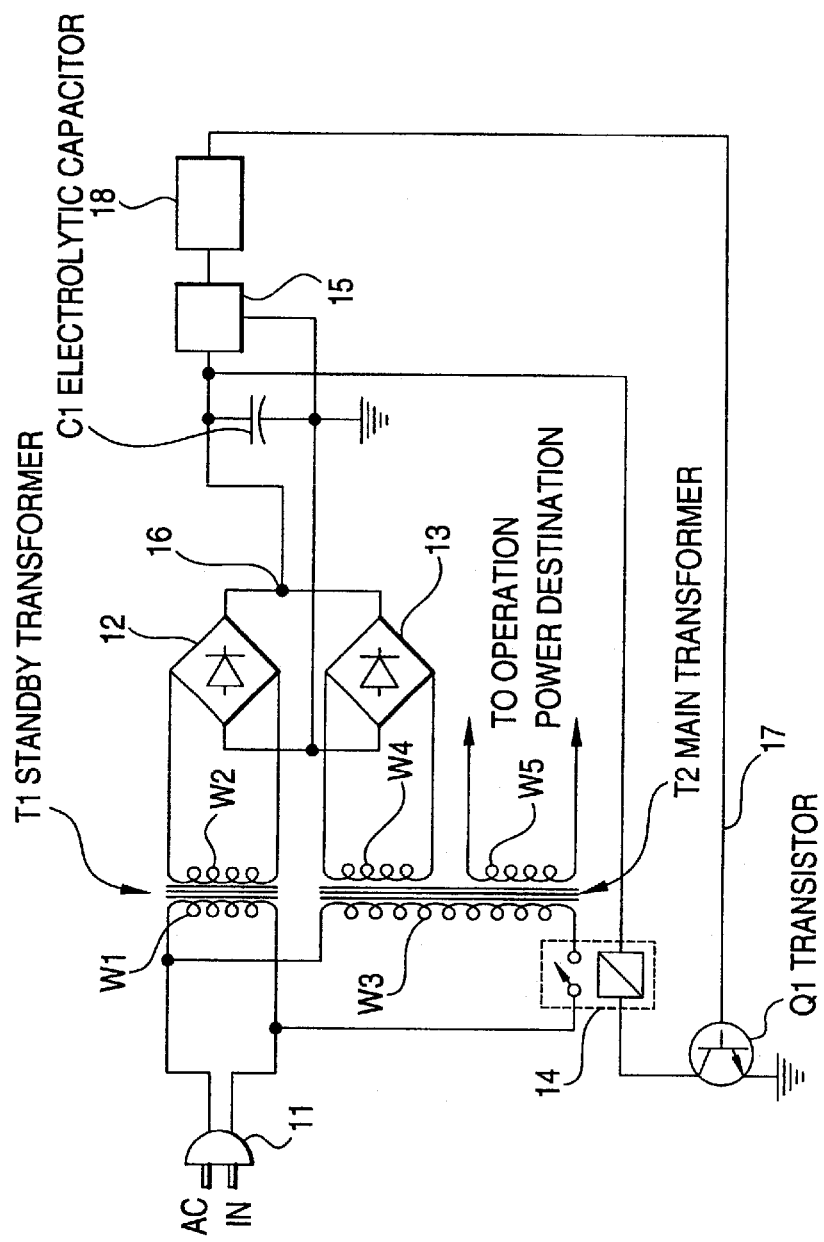
FIG. 1 shows a circuit configuration of a power supplying circuit according to an embodiment of the present invention.

FIG. 1 shows a circuit configuration of a power supplying circuit according to an embodiment of the present invention. A plug 11 for input power is connected to the primary winding W1 of a standby transformer T1. The secondary winding W2 of the standby transformer T1 is connected to a rectification circuit 12. The rectification circuit 12 is connected to an electrolytic capacitor C1, a primary power relay 14, and a control power source 15. The control power source 15 is connected to a remote controller light receiving section, control microcomputer, and so forth 18.

A main transformer T2 is connected to the plug 11 via the primary power relay 14, in parallel with the standby transformer T1. One secondary wiring W4 of the main transformer T2 is connected to a rectification circuit 13 and the other secondary wiring W5 of the main transformer T2 is connected to an operation power destination. The rectification circuit 13 is connected to the electrolytic capacitor Cl, the control power source 15, and the primary power relay 14. That is, the rectification circuits 12 and 13 are connected to each other in parallel.

The primary power relay 14 is connected to the collector of a transistor Q1. The emitter of the transistor Q1 is grounded and its base is connected to the remote controller light receiving section, control microcomputer, and so forth 18 via a control terminal 17 of the control microcomputer.

Next, the operation of the power supplying circuit according to the embodiment will be described. The following description is directed to an example in which the remote controller light receiving section, control microcomputer, and so forth 18 need to be supplied with a control current of 20 mA and the primary power relay 14 is supplied with a current of 40 mA after turning-on of the operation power.

First, a description will be made of a state that the operation power is off. In this case, as described later, no power is supplied from the plug 11 to the main transformer T2 and a current that is output from the plug 11 is only supplied to the standby transformer T1. A secondary current of the standby transformer T1 is rectified by the rectification circuit 12 and then supplied to the control power source 15. A control current of 20 mA is necessary for the remote controller light receiving section, control microcomputer, and so forth 18, and 20 mA is supplied to the control power source 15.

In the state that the operation power is off, the control microcomputer does not supply a control current to the base of the transistor Q1 and hence the transistor Q1 is in an off state. Therefore, no current is supplied to the primary power relay 14, which is hence in an off state. As a result, the main transformer T2 is in an open state for the main power and no power is supplied to the main transformer T2.

As described above, in the state that the operation power is off, the control current of 20 mA that is necessary for the remote controller light receiving section, control microcomputer, and so forth 18 is supplied only from the standby transformer T1.

Next, a description will be made of a state that the operation power is on. When detecting a signal for turning on the operation power, the remote controller light receiving section, control microcomputer, and so forth 18 supply a control current to the base of the transistor Q1 via the control terminal 17 of the control microcomputer. When the control current is supplied to the base of the transistor Q1, the transistor Q1 is turned on and a current is supplied from the standby transformer T1 to the primary power relay 14 via the rectification circuit 12. In this example, since a drive current of 40 mA is supplied to the primary power relay 14. Therefore, at an instant when the primary power relay 14 is turned on, a total current of 60 mA that is the sum of the current of 20 mA that is supplied to the control power source 15 and the drive current of 40 mA for the primary power relay 14 is supplied from the standby transformer T1.

When the primary power relay 14 is turned on upon reception of the drive current, the main transformer T2 is connected to the input power source via the plug 11 and a primary current is supplied to the primary winding W3 of the main transformer T2. As a result, a secondary current is supplied to the secondary winding W4 of the main transformer T2, rectified by the rectification circuit 13, and then supplied to the primary power relay 14 and the control power source 15.

Now, a total current of 60 mA, that is, 20 mA for the control power source 15 plus 40 mA for the primary power relay 14, needs to be supplied. Now that the main transformer T2 is turned on, the total current of 60 mA is supplied from both of the standby transformer T1 and the main transformer T2.

The ratio between the current that is supplied in this state from the standby transformer T1 and the current that is supplied from the main transformer T2 can be set freely by properly setting the internal impedance of the secondary winding W2 of the standby transformer T1 and that of the secondary winding W4 of the main transformer T2.

The rectification circuit 13 can prevent a secondary current of the standby transformer T1 from flowing into the main transformer T2, and the rectification circuit 12 can prevent a secondary current of the secondary winding W4 of the main transformer T2 from flowing into the standby transformer T1.

Next, a description will be made of a series of operations during a period when the operation power is off, at an instant when the operation power is turned on, and after the turning-on of the operation power.

Figure 2:
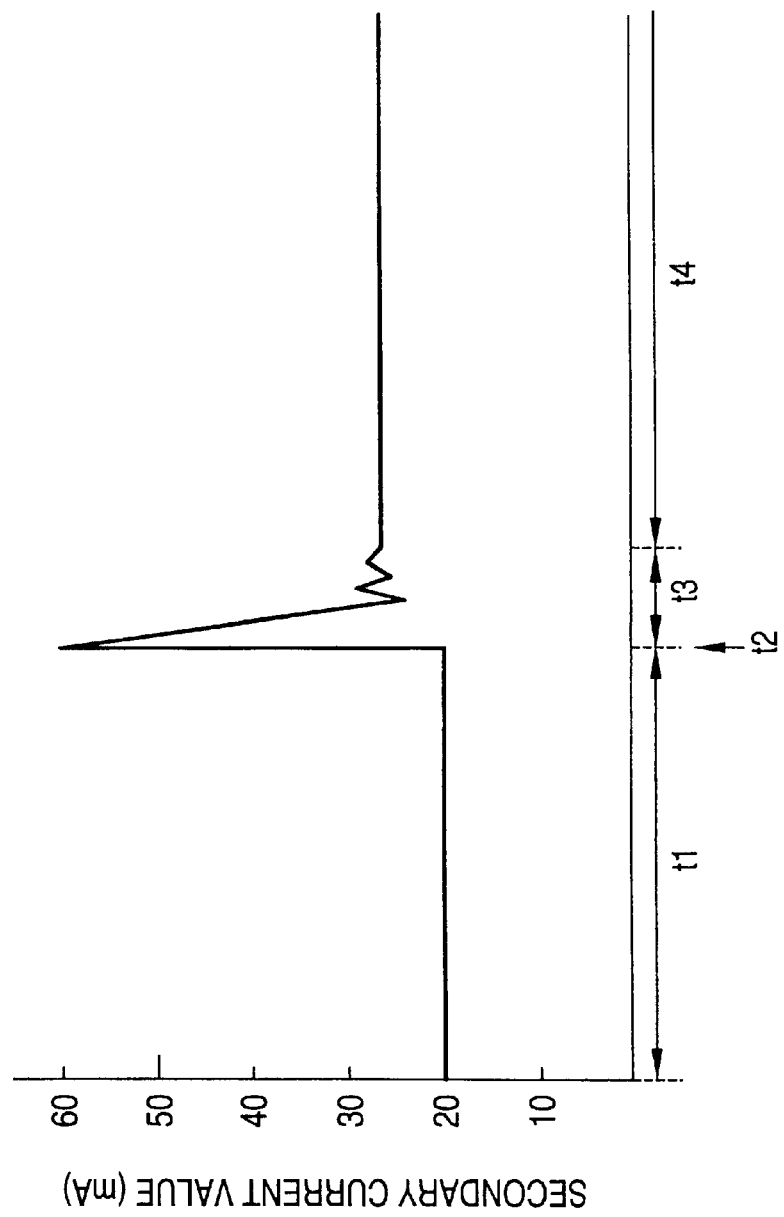
FIG. 2 is a graph showing the effective value of a secondary current flowing through the secondary winding of the standby transformer.
Figure 3:
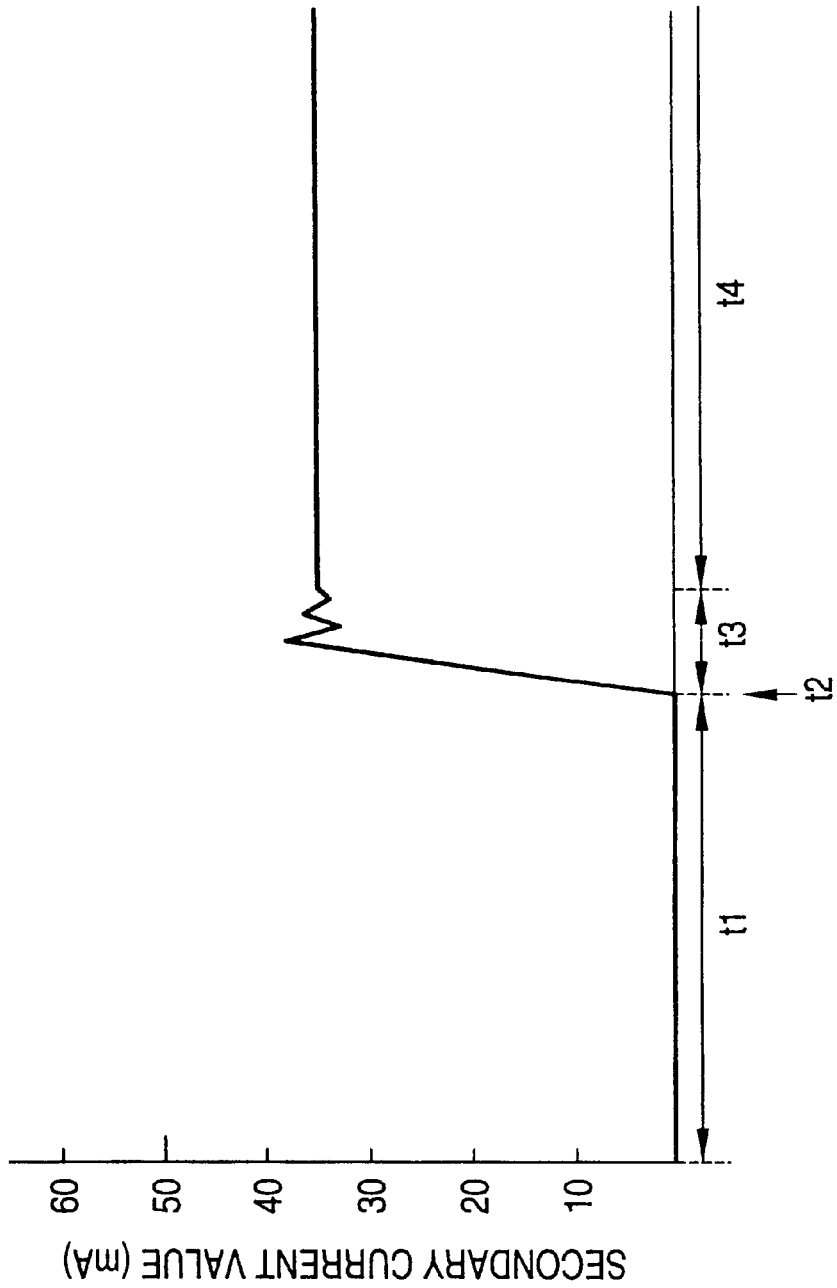
FIG. 3 is a graph showing the effective value of a secondary current flowing through a secondary winding of a main transformer.

FIG. 2 shows the effective value of a secondary current flowing through the secondary winding W2 of the standby transformer T1 during a period t1 when the operation power is off, at an instant t2 when the operation power is turned on, during a period t3 immediately after the turning-on of the operation power, and during a period t4 after the turning-on of the operation power. FIG. 3 shows the effective value of a secondary current flowing through the secondary winding W4 of the main transformer T2 during the period t1, at the instant t2, and during the periods t3 and t4.

During the period t1 when the operation power is off, only the standby transformer T1 supplies power to the control power source 15. Therefore, as shown in FIG. 2, the effective value of the secondary current of the standby transformer T1 is equal to 20 mA that is the standby current value. As shown in FIG. 3, the effective value of the secondary current of the main transformer T2 is equal to 0 mA.

At the instant t2 when the operation power is turned on, only the standby transformer T1 drives the primary power relay 14. Therefore, as shown in FIG. 2, the effective value of the secondary current of the standby transformer T1 increases to 60 mA that is the sum of the control current and the drive current for the primary power relay 14. At the instant when the primary power relay 14 starts to be driven, the main transformer T2 has not been turned on yet. Therefore, as shown in FIG. 3, the effective value of the secondary current of the main transformer T2 remains 0 mA.

During the period t3 immediately after the turning-on of the operation power, the primary power relay 14 is kept driven and the main transformer T2 is turned on, whereby the main transformer T2 starts to supply a secondary current. Accordingly, the secondary current of the standby transformer T1 starts to decrease.

During the period t4 after the turning-on of the operation power, the secondary current values of the standby transformer T1 and the main transformer T2 are stabilized.

A description will now be made of the rated current that is required for the standby transformer T1.

In general, the rated current of a transformer is the maximum value of a current that flows through the transformer in an equilibrium state that a temperature increase of the winding due to the current and a temperature decrease due to heat dissipation are balanced with each other and that can assure the characteristics of the winding. Therefore, even if a current that is larger than the rated current flows through a transformer instantaneously, there occurs no problem relating to the use of the transformer unless the current is large enough to break the transformer instantaneously.

As shown in FIG. 2, among the period t1 when the operation power is off, the instant t2 when the operation power is turned on, the period t3 immediately after the turning-on of the operation power, and the period t4 after the turning-on of the operation power, the largest secondary current flows through the standby transformer T1 at the instant t2 when the operation power is turned on. In the example being considered, at this instant, a secondary current of 60 mA in total that is the sum of the control current of 20 mA and the drive current of 40 mA for the primary power relay 14 flows through the standby transformer T1.

However, the time during which this current of 60 mA flows through the standby transformer T1 is just an instant when the primary power relay 14 is activated. Immediately thereafter, the secondary current value of the standby transformer T1 quickly decreases toward stabilization. Therefore, the rated current of the standby transformer T1 need not be larger than 60 mA and may have a value that is greater than 20 mA that is the current value during the period t1 when the operation power is off and that is also greater than the current that flows through the standby transformer T1 during the period t4 after the turning-on of the operation power. For example, if the secondary current that flows through the standby transformer T1 during the period t3 after the turning-on of the operation power is 25 mA, the rated current of the standby transformer T1 may be set at a value that is greater than 25 mA. Therefore, a transformer of the IE-28 size having a rated current of 40 mA can be used.

In general, as long as transformers are used with a current that is smaller than the rated current, a transformer having a small rated current has smaller loss (iron loss, copper loss, and so forth) than a transformer having a large rated current. Therefore, if a transformer having a small rated current is used as the standby transformer T1 under a condition that a current flowing through it is smaller than the rated current, the standby power consumption can be made lower than in a case where a transformer having a large rated current is used as the standby transformer T1. If the above-mentioned transformer of the IE-28 size is used as the standby transformer T1 under a condition that a current of 20 mA is supplied to the control power source 15, the standby power consumption can be made 1 W or less.

As described above, in this embodiment, only the standby transformer T1 supplies a current to the control power source 15 during a period when the operation power is off and to the primary power relay 14 at an instant when the primary power relay 14 is activated. After the operation power is turned on, both of the standby transformer T1 and the main transformer T2 supply power to the control power source 15 and the primary power relay 14. Therefore, the rated current of the standby transformer T1 as well as its standby power consumption during a period when the operation power is off can be made small.

Since a transformer having a small rated current is generally less expensive than a transformer having a large rated current, the embodiment makes it possible to produce a less expensive power supplying circuit.

Since a transformer having a small rated current is generally smaller in volume than a transformer having a large rated current, the embodiment makes it possible to produce a more compact power supplying circuit.

In this embodiment, the standby transformer T1 and the main transformer T2 are connected to each other in parallel and the secondary current values of the standby transformer T1 and the main transformer T2 are determined by their internal impedance values. An alternative configuration is possible in which a contact is provided at a parallel connecting portion 16 that is a connecting portion of the standby transformer T1 and the main transformer T2 in addition to the contact that is used for turning on/off the main transformer T2 in the primary power relay 14 and switching is made between the secondary current values of the standby transformer T1 and the main transformer T2 by making on/off switching with the additional contact. In this case, while the main transformer T2 is off, the additional contact of the primary power relay 14 that is provided at the parallel connecting portion 16 serves to connect the rectification circuit 12 to the control power source 15 and the primary power relay 14. While the main transformer T2 is off, the additional contact serves to connect the rectification circuit 13 to the control power source 15 and the primary power relay 14. This makes it possible to supply power to the control power source 15 and the primary power relay 14 from only the standby transformer T1 while the operation power is off, and to supply power to those from only the main transformer T2 after turning-off of the operation power. This configuration can also reduce the rated current of the standby transformer T1.

What is claimed is:

1. A power supplying circuit comprising;
    a source of input power;
    a primary power relay for opening and closing an input circuit of a main transformer in circuit with said source of input power;
    a standby transformer in circuit with said source of input power for supplying standby power, the standby transformer having a smaller current capacity than a rated drive current capacity of the primary power relay: and
    power supply control means for causing the primary power relay to turn on the main transformer when supplying standby power, and for causing a supply of power from an output of the main transformer to the primary power relay after turning-on of the main transformer.

2. The power supplying circuit according to claim 1, wherein the power supply control means comprises:
    a drive circuit for driving the primary power relay in accordance with a signal that is supplied from a control element of a control circuit that operates on power that is supplied from the standby transformer; and
    switching means for switching an output from which to supply power to the primary power relay from an output of the standby transformer to outputs of both of the standby transformer and the main transformer.

3. The power supplying circuit according to claim 2, wherein the switching means is such that a rectification output of the standby transformer and a rectification output of the main transformer are connected to each other in parallel.

4. The power supplying circuit according to claim 1, wherein lab switching means comprises a contact of the primary power relay.

5. A switching means of the power supplying circuit according to claim 1, wherein the primary power relay is a DC relay.

6. A power supplying method comprising the steps of:
    turning on a primary power relay that opens and closes an input circuit of a main transformer, by using an output of the standby transformer; and
    supplying power to the primary power relay from an output of the main transformer after turning-on of the main transformer.

7. A power supplying circuit for selectively supplying operation power and continuously supplying standby power to selected circuits, comprising:
    a source of input power;
    a standby transformer having its input in circuit with said source of input power and its output in circuit with a rectifying circuit for supplying standby power to a control power source;
    a main transformer having its input in circuit with said source of input power only when supplying main power, an output of the main transformer being in circuit with a rectifying circuit for supplying main power to said control power source, said main transformer being in parallel with said standby transformer;
    a primary power relay in circuit with the input of said main transformer for interrupting said supply of power to said main transformer when in a standby condition, said standby transformer having a smaller current capacity than a rated drive current capacity of the primary power relay; and a drive circuit for driving the primary power relay in accordance with a signal that is supplied from a control circuit that includes said control power source and that operates on power that is supplied from the standby transformer; and a switch for switching an output from which to supply power to the primary power relay from an output of the standby transformer to outputs of both of the standby transformer and the main transformer.

8. The power supplying circuit as set forth in claim 7 wherein the rectification circuit in circuit with the output of the standby transfer and the rectification circuit in circuit with the output of the main transformer are in parallel.

9. The power supplying circuit as set forth in claim 7, wherein the primary power relay has a contact in circuit with the input circuit of the main transformer.

* * * * *

UNITED STATES PATENT AND TRADEMARK OFFICE
CERTIFICATE OF CORRECTION

PATENT NO. : 6,307,762 B1
DATED : October 23, 2001
INVENTOR(S) : Hideaki Shiobara It is certified that error appears in the above-identified patent and that said Letters Patent is hereby corrected as shown below:

<u>Column 6,</u>
Line 27, replace "2" with -- 1 --.
Line 33, replace "lab" with -- the --.
After line 38 and before line 39 insert -- providing a source of input power; --.
Line 40, after "transformer" insert -- in circuit with the source of input power when supplying standby power, --.
Line 44, after "transformer" insert -- by connecting said input circuit with the source of main power --.

Signed and Sealed this

Eighteenth Day of June, 2002

*Attest:*

JAMES E. ROGAN
*Director of the United States Patent and Trademark Office*

*Attesting Officer*